(12) United States Patent
Butterbach et al.

(10) Patent No.: US 9,487,686 B2
(45) Date of Patent: Nov. 8, 2016

(54) REACTIVE TWO-COMPONENT HOTMELT ADHESIVE COMPOSITION

(71) Applicant: Henkel AG & Co. KGaA, Duesseldorf (DE)

(72) Inventors: Ruediger Butterbach, Essen (DE); Siegfried Kopannia, Krefeld (DE); Carsten Schubert, Duesseldorf (DE); Judith Siepenkothen, Ratingen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 361 days.

(21) Appl. No.: 14/294,872

(22) Filed: Jun. 3, 2014

(65) Prior Publication Data

US 2014/0287173 A1    Sep. 25, 2014

Related U.S. Application Data

(63) Continuation of application No. PCT/EP2012/072314, filed on Nov. 9, 2012.

(30) Foreign Application Priority Data

Dec. 6, 2011   (DE) .................. 10 2011 087 834

(51) Int. Cl.
| | | |
|---|---|---|
| *C09J 165/00* | (2006.01) | |
| *C09J 123/08* | (2006.01) | |
| *C09J 5/00* | (2006.01) | |
| *C09J 5/06* | (2006.01) | |

(52) U.S. Cl.
CPC ............... *C09J 165/00* (2013.01); *C09J 5/00* (2013.01); *C09J 5/06* (2013.01); *C09J 123/0853* (2013.01); *Y10T 428/1328* (2015.01); *Y10T 428/269* (2015.01); *Y10T 428/2826* (2015.01)

(58) Field of Classification Search
CPC .... C09J 165/00; C09J 123/0853; C09J 5/00; C09J 5/06; Y10T 428/269; Y10T 428/1328; Y10T 428/2826
See application file for complete search history.

(56) References Cited

U.S. PATENT DOCUMENTS

| | | | |
|---|---|---|---|
| 5,470,622 A | 11/1995 | Rinde et al. | |
| 8,778,129 B2 | 7/2014 | Bilcai et al. | |
| 2008/0039594 A1* | 2/2008 | Moeller | C09J 115/00 525/523 |
| 2010/0017601 A1 | 1/2010 | Falk et al. | |
| 2012/0161565 A1* | 6/2012 | Bilcai | C09J 5/06 310/154.07 |

FOREIGN PATENT DOCUMENTS

| | | |
|---|---|---|
| DE | 102008019439 | 10/2009 |
| DE | 102009028180 | 2/2011 |
| WO | 2006084537 | 8/2006 |
| WO | 2008137119 | 11/2008 |
| WO | 2009037433 | 3/2009 |

OTHER PUBLICATIONS

International Search Report issued in connection with International Patent Application No. PCT/EP2012/072314 mailed on Jan. 24, 2013.
DIN 53011.
ISO 1133
ASTM D 3236.
DIN EN ISO 11339.

* cited by examiner

*Primary Examiner* — Michael C Miggins
(74) *Attorney, Agent, or Firm* — James E. Piotrowski

(57) ABSTRACT

A reactive hotmelt adhesive comprising two components A and B each containing one or more polymers A or B having different functional groups, these groups being able to react with one another under the influence of temperature, and i) the mutually reactive functional groups are selected from hydroxyl, amine, carboxylic acid, anhydride and epoxide groups, ii) unreactive polymers and/or additives are present in at least one of the components, iii) the components are present in spatially separate regions, the adhesive having a first temperature range between 80 and 150° C. in which the components melt and are miscible with one another without reaction of the functional groups with one another, and the adhesive having a second temperature range between 130 and 190° C. in which it can melt and chemically crosslink, the second temperature being above the first temperature.

19 Claims, No Drawings

REACTIVE TWO-COMPONENT HOTMELT ADHESIVE COMPOSITION

The invention relates to a melt adhesive composition that contains two different polymers which comprise groups reactive with one another, and these polymers mix and react with one another upon melting. Also described is a method wherein a heat-shrinkable substrate is adhesively bonded when hot to an object.

Methods for adhesively bonding and sealing different substrates are commonly known. Such methods are also used, for example, in order to mutually connect pipe passthroughs, cable passthroughs, or cable connectors, and seal them with respect to external influences. Non-crosslinking or crosslinking polymer systems can be used; these are usually applied hot, so that possible cavities can be filled up.

WO 2000/137119 describes an adhesive bonding system in which a thermally conductive adhesive is applied on the inner side of a substrate, said adhesive is brought into contact with an outer casing constituting a second substrate, and the outer casing is then shrunk by the action of heat. Thermally conductive adhesives are described as adhesives, wherein conductivity being produced by the addition of carbon, metal, metal oxides, and similar powders.

U.S. Pat. No. 5,470,622 describes a method for connecting objects, wherein a reactive adhesive is applied onto a substrate, an outer substrate manufactured from a heat-deformable material is joined thereto, and the outer substrate is shrunk onto the inner object by heating. Amorphous thermoplastic binding agents, for example polystyrene, polyamides, polyurethanes, polycarbonates, and polyacrylates, are described here as an adhesive.

WO 2009/037433 describes a tubular, heat-shrinkable object that can applied around an inner wire as a filler material. It contains on the inner side a layer, flowable when hot, that can consist e.g. of EVA copolymers. Further statements regarding the composition of the adhesive are not made.

Adhesives and sealants that are known are, for example, reactive one-component materials that can for example crosslink with moisture. It is likewise known that two-component materials, which crosslink a short time after mixing and application onto the adhesion site, are used. One-component materials that comprise groups which are reactive with moisture can be stored in an anhydrous state. Correspondingly complex packaging and application of these materials is therefore required. If two-component materials are employed, they must be mixed before bonding. In order to achieve a planned strength, it is necessary to ensure that a predefined mixing ratio is conformed to. This can be achieved by the use of an apparatus, but such mixing apparatuses are expensive. A further disadvantage is the fact that these materials are often still liquid at room temperature. Crosslinking to yield a solid adhesive material requires a reaction time. During that time the substrates to be bonded can still move with respect to one another, and further processing is therefore not yet possible.

If non-crosslinking polymers are employed, for example hot-melt adhesives, they generally do not require special storage conditions. It must be noted, however, that in some circumstances, under utilization conditions, these materials also become soft again when heated. They thus at least partly lose their mechanical adhesive properties, and the stability and properties of the final adhesive bond are thus not ensured over the long term.

The object of the present invention is therefore to provide an adhesive and sealant composition that can be stored in granulate form. Reactive groups that can react upon application of heat are to be contained. The corresponding granulated compositions are intended to be stable, and not to react, under usual storage conditions. For utilization, the materials are to be melted and applied onto the substrate parts to be bonded. The adhesive and sealant on the pre-coated substrates can be crosslinked by further raising the temperature. It is thereby possible to separate, in terms of working technology, the working steps of producing the adhesive and sealant compositions, coating objects with a crosslinkable composition, and subsequently bonding and crosslinking the adhesive. A corresponding adhesive bonding method for industrial use is thereby simplified.

The object is achieved by a reactive melt adhesive comprising two separately present components A and B each containing one or more polymers A or B having different functional groups, wherein these groups can react with one another under the influence of temperature, and the functional groups reactive with one another are selected from COOH, OH, NH, epoxy, anhydride, in at least one of the components nonreactive polymers and/or additives are contained, wherein the components are present in physically separated regions, characterized in that the melt adhesive exhibits a first temperature in a range between 80 and 150° C. in which the components melt and are miscible with one another but the functional groups do not react with one another, the adhesive melts and chemically crosslinks in a second temperature range between 130 and 190° C., wherein the second temperature is above the first temperature.

The invention further relates to an object that is coated with an adhesive according to the present invention in a non-crosslinked state. The invention further relates to a method for adhesively bonding two substrates, wherein a reactive adhesive according to the present invention is mixed accompanied by melting, this adhesive melt is applied onto a first substrate and optionally is bonded to a second substrate after cooling, wherein the two substrates and the adhesive are heated to a second temperature above the melting temperature.

According to the present invention the melt adhesive must contain two different polymers. "Different polymers" for purposes of this invention means either that two polymers having a different backbone are selected, or that polymers of the same chemical composition, but that carry different functional groups, are selected. In addition, the polymers can differ in terms of their molecular weight.

Those polymers which are solid at 25° C. are suitable as polymers A or B that are equipped with reactive groups. They can be selected from polyesters, polyamides, polypropylenes, acrylate copolymers, for example ethylene(meth)acrylate copolymers, or (meth)acrylate polymers. Base polymers can be selected which are then modified with suitable functional groups or already contain such groups.

Poly(meth)acrylates are one group of suitable base polymers. Such polyacrylates are obtainable, for example, by polymerization or copolymerization of ethylenically unsaturated carboxylic acid esters. The notation "(meth)acrylate" here means both methacrylate and acrylate, and mixtures of the two. Suitable monomers are selected from the group of (meth)acrylates, for example alkyl(meth)acrylates, of straight-chain, branched, or cycloaliphatic alcohols having 1 to 40 carbon atoms, for example methyl acrylate, ethyl acrylate, butyl acrylate; aryl(meth)acrylates, for example benzyl(meth)acrylate or phenyl(meth)acrylate; mono(meth) acrylates of ethers or polyoxyalkylene glycols. Functionalized (meth)acrylate monomers can also be polymerized in, for example hydroxyalkyl(meth)acrylates of straight-chain, branched, or cycloaliphatic diols having 2 to 36 carbon atoms, or epoxy (meth)acrylates.

Besides the (meth)acrylates described, the compositions to be polymerized can also comprise further unsaturated monomers that are copolymerizable. These include, inter alia, 1-alkenes, branched alkenes, acrylonitrile, vinyl esters such as vinyl acetate, styrene, substituted styrenes, heterocyclic compounds such as 2-vinylfuran, maleic acid derivatives, dienes, and amino-functionalized and/or mercapto-functionalized compounds. Such polymers are obtainable in many compositions and molecular weights.

Copolymers such as ethylene-alkyl acrylate copolymers, ethylene-alkyl methacrylate copolymers, ethylene-acrylic acid copolymers, and terpolymers with ethylene(meth)acrylate are also suitable. Those copolymers having a (meth)acrylate content from 2 to 45 wt % are particularly suitable.

Polyamides can also be used according to the present invention as a base polymer. Those polyamides which contain dimer fatty acids and derivatives thereof as a structural component are particularly suitable. In addition, other C4 to C18 dicarboxylic acids can also be contained. The diamino component of suitable polyamides is made up substantially of one or more aliphatic diamines, preferably having an even number of carbon atoms, wherein the amino groups are at the ends of the carbon chains. The aliphatic diamines can contain 2 to 20 carbon atoms, wherein the aliphatic chain can be linear or slightly branched. The amino component can furthermore contain cyclic diamines or heterocyclic diamines. In addition, polyoxyalkylenediamines can also be used. Such polyamides are commercially available.

Polyolefin copolymers are furthermore also suitable, for example ethylene/propylene copolymers, butylene/propylene copolymers, or ethylene/butylene/propylene terpolymers.

Polyesters are likewise suitable as base polymers. It is possible, for example, to use polyester polyols that are obtained by reacting low-molecular-weight alcohols, for example ethylene glycol, diethylene glycol, neopentyl glycol, glycerol, or trimethyloipropane, or polyoxyalkylene glycols, with polycarboxylic acids. These can be dicarboxylic acids and/or tricarboxylic acids or derivatives thereof. Suitable dicarboxylic acids are, for example, adipic acid or succinic acid, unsaturated dicarboxylic acids such as maleic acid or fumaric acid, and aromatic dicarboxylic acids. The aforesaid acids can be employed individually or as mixtures of two or more thereof.

The polymers suitable according to the present invention are solid at room temperature (25° C.). They have, in particular, a softening point above 75° C. (measured per DIN 53011); the upper limit is preferably below 200° C.

Polymers A and B suitable according to the present invention must comprise functional groups. These functional groups are intended to be individually stable, but as a mixture of polymers A and B they are intended to be able to crosslink under the influence of heat. Examples of such functional groups are anhydride groups, epoxy groups, carboxylic acid groups, primary and/or secondary amino groups, OH groups. The functional groups of polymers A or B are selected so that together they can react with one another, for example anhydride groups with amino groups, anhydride groups with OH groups or epoxy groups, epoxy groups with amino groups, carboxylic acid groups with epoxy groups or amino groups. Two different functional groups can also be present on one polymer or in one component, provided there is assurance that they do not react with one another, for example OH groups and amino groups or carboxylic acid groups and anhydride groups.

The number of functional groups per polymer chain is selected so that crosslinking is assured; for example, on average more than 1.5, preferably at least two, functional groups per molecule are to be contained. If a larger number of functional groups is selected, the degree of crosslinking of the adhesive increases. If a lower number is selected, the crosslinking density decreases and the adhesive remains elastic, or becomes crosslinked only in gel-like fashion.

The functional groups can be reacted in various ways into the polymer. For example, in the manufacture of the polymers it is possible to employ monomers that comprise, in addition to the polymerizable group, a further functional group, for example an OH group, that does not participate in construction of the polymer backbone. Another possibility is to functionalize polymers subsequently. For example, polyolefins can be subsequently equipped with functional groups by oxidation, or by reactive modification with monomers that contain polar groups. A further possibility is to introduce functional groups into polymers by means of polymer-analogous reactions. For example, isocyanate groups can be modified using low-molecular-weight compounds that comprise a group reactive with NCO groups, as well as another of the functional groups mentioned above. Another possibility is to functionalize, for example, anhydride-group-containing polymers by reaction with low-molecular-weight compounds that comprise a nucleophilic group and a further functional group.

Such reactions for the manufacture of the functionalized polymers A and B are known to one skilled in the art. Such polymers are also commercially obtainable. These polymers are individually shelf-stable.

The functionalized polymers suitable according to the present invention must be solid at room temperature. They usually have a molecular weight from 500 to 200,000 g/mol (number-average molecular weight MN, as determinable using GPC). The softening point of these polymers is to be above 75° C. It is furthermore below 150° C., in particular below 130° C. The softening point can be influenced by the molecular weight of the polymers or by the composition of the monomers. Polymers A or B are to have, in the melted state, a melt index from 2 to 2500 g/10 min (190° C., 2.16 kg, ISO 1133) or a viscosity at 80 to 150° C. from 5000 mPas to 2,000,000 mPas (Brookfield viscometer, ASTM D 3236).

The functional groups of polymers A and B are selected so that they have a reaction temperature for the crosslinking reaction from 130 to 190° C., in particular from 140° C. to 170° C. It is essential in this context that the reaction temperature be above the melting temperature, for example more than 30° C. above the melting temperature from the first range. "Reaction temperature" is to be understood to mean that in a time of up to 20 minutes, the functional groups react and the adhesive forms a gel or a network. The reaction can be identified by an increase in viscosity by a factor of at least 2. At the melting temperature the adhesive is intended essentially not to crosslink, but the viscosity of the melt can increase slightly.

In accordance with a preferred embodiment, the melt adhesive according to the present invention is notable for the fact that component A contains polymer A, and component B contains polymer B, wherein polymers A and B in particular are different.

Additional substances, such as additives and/or nonreactive polymers, are contained as further constituents in the melt adhesive according to the present invention. These additional substances can be contained in one of the two components A or B, or in both. Examples of suitable inert polymers are those having no reactive groups, such as EVA and polyolefins; nonreactive resins are also suitable; stabilizers, antioxidants, catalysts, pigments, fillers, adhesion promoters, plasticizers, or waxes can also be contained. The quantity of all additional substances is to amount to up to 80 wt % based on the adhesive, in particular up to 70 wt % (based on the melt adhesive).

It is preferably useful if the adhesives according to the present invention contain 10 to 79 wt % inert polymers and/or resins. Ethylene-vinyl acetate copolymers (EVA) that comprise no reactive functional groups are particularly suitable here. Such copolymers are known to one skilled in the art. These are polymers having a vinyl acetate content from 10 to 40 mol %, based on the sum of the monomers. Further co-monomers can also optionally be contained. These polymers contain no groups reactive with the reactive functional groups recited above. They are readily miscible with the functionalized polymers.

A further group of suitable inert polymers is copolymers of 1-alkylenes and acrylate monomers. These are likewise intended to comprise no crosslinkable functional groups. They are usually readily compatible with polymers A and B. The polymers are to have a low viscosity. Ethylene/methacrylate copolymers are particularly suitable.

Polymers that have a viscosity, for example, from 5000 to 2,000,000 mPas at 160° C., preferably below 200,000 mPas, are particularly suitable. Low viscosities are preferred in order to improve miscibility of the components. Such polymers are commercially obtainable. EVA polymers are particularly preferred.

Suitable resins are the known resins that are solid at room temperature. These are known to one skilled in the art. They are, for example, aromatic, aliphatic, or cycloaliphatic hydrocarbon resins, as well as modified or hydrogenated versions thereof. Further suitable resins are abietic acid derivatives, modified natural resins, such as balsam resin, tall resin, or wood rosin; alkyl esters of rosin; terpene resins such as styrene terpenes, a-methylstyrene terpenes, and hydrogenated derivatives thereof; acrylic acid copolymerizates, preferably styrene-acrylic acid copolymers. The quantity of inert polymers or resins can be 0 to 80%, in particular 10 to 70 wt %, very particularly preferably 20 to 70 wt %.

Plasticizers are used preferably to adjust the viscosity or flexibility, and are generally contained at a concentration from 0 to 20 wt %, preferably from 0 to 15 wt %. Suitable plasticizers are, for example, white oils, mineral oils, polypropylene oligomers, polybutene oligomers, polyisoprene oligomers, benzoate esters, phthalates, hydrocarbon oils, polypropylene glycol, and polybutylene glycol. These must be compatible with polymers A and B.

Waxes, in quantities from 0 to 5 wt %, can optionally be added to the adhesive. The quantity is preferably to be such that on the one hand the viscosity is lower into the desired range, but on the other hand adhesion is not negatively influenced. The wax can be of natural or synthetic origin. Vegetable waxes, animal waxes, mineral waxes, or petrochemical waxes can be used as natural waxes.

Usual stabilizers or catalysts can furthermore be added to the melt adhesive according to the present invention. The purpose of stabilizers is to protect the adhesive from breakdown during processing. Antioxidants are to be recited here in particular. Catalysts can be selected in accordance with the reactive groups. They accelerate the crosslinking reaction. Quantities of up to 3 wt % are usually added to the melt adhesive.

Pigments or fillers are a further additive. The are to be present in finely distributed form, and can be employed in quantities of up to 30 wt %. The usual pigments or fillers, such as metal oxides, carbon black, chalk, aluminum silicates, and similar powders can be used.

Depending on the embodiment, the additives can be present individually or severally in one or in both components. It is known in this context either that these added substances are mixed in an extruder, or the constituents are melted in an agitator vessel and are mixed by homogenization with a mixing unit.

A preferred embodiment of the complete melt adhesive contains 10 to 70% polymer A, 10 to 70% polymer B, 10 to 70% inert polymers and/or resin, 0 to 30% additives, in particular pigment/fillers and stabilizers. The sum is to equal 100%. Polymer A is preferably contained in component A, and polymer B preferably in component B.

It corresponds to a preferred embodiment of the invention if the melt adhesive, after heating to the first temperature and mixing, is present as a homogeneous layer on a plastic substrate.

It is necessary according to the present invention for components A and B to be present physically separately from one another. This can be achieved, for example, by the fact that the polymers are manufactured separately and are mixed with the added substances. In an embodiment, the components are then milled or granulated. The particle size should be generally less than 10 mm, for example less than 5 mm, in particular greater than 50 μm, preferably greater than 200 μm. After milling or granulation, the two components can be mixed as solids. The particle size is to be selected in such a way that demixing in the context of storage and transport is avoided if at all possible. This can optionally be assisted in that such powders or granulates are partly sintered onto one another at the surface by brief heating. Shelf-stable granulated adhesive mixtures are thereby obtained.

Another embodiment of the invention provides, for example by coextrusion, a strand of an adhesive according to the present invention that comprises a component A internally and the other component B on the outer side. As a result of cooling immediately after coextrusion, the different components do not mix, and after comminution can be obtained as a granulate that comprises both components joined to one another. The mixing ratio of components A and B can be adjusted directly in the context of coextrusion by way of the layer thickness of the respective polymers.

Two parallel strands of components A and B, adhering to one another, can also be extruded, and can then be granulated.

The mixtures of the reactive melt adhesive are storable provided they are stored below the softening temperature range.

As already described above, the melt adhesives according to the present invention are storable. They can be transported to the user as a powder or granulate. In order to carry out a method according to the present invention, the granulates are melted at a temperature that is below the reaction temperature of the functional groups. The melting temperature is generally between 80 and 150° C. Melting can occur in known apparatuses; it can be carried out batchwise, but a continuous method is particularly suitable. For this, the polymers can, for example, be melted and mixed in an extruder. It is useful if the necessary dwell time at elevated temperatures is kept as short as possible, but mixing of the polymers is to be ensured. Negative effects on the polymers can thereby be avoided.

Polymers A and B and the additives are preferably selected so that the adhesive has, in the range from 80 to 150° C., a viscosity from 10,000 to 500,000 mPas (measured per ASTM D 3236), in particular below 200,000 mPas. The melting temperature for mixing is preferably adjusted so that it is below the reaction temperature of the functional polymers.

In a method according to the present invention the adhesive is melted, preferably as a granulate, in small portions and then applied. After homogeneous mixing of the melt adhesive, the latter is applied directly onto the substrate. A layer that has a thickness from 5 μm to 1000 μm, in particular from 10 to 200 μm, can be generated on the substrate. The adhesive layer can then be cooled, and the coated substrate is storable at room temperature. The intermediate products coated in this manner can then be used for adhesive bonding to other substrates.

Another embodiment does not use the adhesive as a coating of a flat substrate, for example a film, but instead coats the inner side of a tubular substrate. This can also be carried out continuously, the tube then being packaged in suitable pieces. These coated intermediate products are likewise storable. This product can then, in a further working step, be employed as a casing around an object, for example a plug connection.

In a further embodiment, however, it is also possible for the mixture of the melt adhesive to serve as an encapsulation or injection-molding component for adhesively bonding and sealing other substrates. Here an internally located substrate, for example a metallic or ceramic object, is encased with an external plastic casing. An adhesive according to the present invention can be injected under pressure into the cavity between the casing and substrate.

As a further method step for final crosslinking of the melt adhesive according to the present invention, the latter is heated. Heating is to be carried out to a temperature that is above the reaction temperature of the functional groups. This is between 130 and 190° C., in particular above 140° C. The adhesive crosslinks at this temperature, and a crosslinked or gel-like mass having good adhesion is produced.

Heating can be carried out using known methods. Examples thereof are IR, NIR, hot air, flaming, or heating plates. The substrate side can be heated provided it is not thereby damaged. A particularly preferred embodiment uses IR or NIR radiation. It is useful in this case if the substrate onto which the adhesive according to the present invention has been applied is transparent. In another embodiment, a pigmented adhesive is used which facilitates heating.

In a very particularly preferred embodiment, the substrate that is used as a carrier material for the melt adhesive is a shrinkable material. The latter is selected in such a way that the shrinkage temperature is above the melting temperature. The heat introduced in the crosslinking step causes the melt adhesive to melt, and simultaneously causes the substrate casing to shrink. As a result of the shrinkage process, the melted melt adhesive is forced into cavities that may still be present in the substrate to be encased. This procedure can ensure good sealing, without cavities, of connections.

The usual substrates that are stable at the utilization temperatures can be employed as a substrate. These can be plastic, metal, ceramic, wood materials, or other materials. A preferred embodiment uses flexible plastic substrates as a substrate for applying the adhesive layer. The crosslinkable melt adhesive according to the present invention is particularly suitable for adhesive bonding and sealing of tubular plastic substrates having plug connections.

The melt adhesive according to the present invention provides a reactive adhesive in a reaction mixture. As a result of the spatial separation of the components, it has good shelf stability. The adhesive can be employed as a pre-coating in intermediate products. Elastic and good bonding and sealing of the substrates is obtained after final crosslinking.

EXAMPLES

| | Constituent | Characterization |
|---|---|---|
| I | Hydrogenated cycloaliphatic hydrocarbon resin | Viscosity (160° C.) = 160 mPas<br>Softening point = 85° C.<br>Acid no. = 0 mg KOH/g |
| II | Ethylene-butyl acrylate copolymer | MI = 305 g/10 min<br>36 wt % butyl acrylate<br>Acid no. = 0 mg KOH/g |
| III | Ethylene-vinyl acetate copolymer | MI = 530 g/10 min<br>19 wt % vinyl acetate<br>Acid no. = 0 mg KOH/g |
| IV | Ethylene-acrylic acid ester-maleic acid anhydride terpolymer | MI = 200 g/10 min<br>7 wt % acrylic acid ester<br>3 wt % maleic acid anhydride<br>Acid no. = 17 mg KOH/g |
| V | Ethylene-acrylic acid copolymer | MI = 25 g/10 min<br>15 wt % acrylic acid<br>Acid no. = 90 mg KOH/g |
| VI | Ethylene-acrylic acid ester-glycidyl methacrylate (GMA) | MI = 6 g/10 min<br>24 wt % methacrylate<br>8 wt % glycidyl methacrylate<br>Acid no. = 25 mg KOH/g |
| VII | Ethylene-glycidyl methacrylate | MI = 5 g/10 min<br>0 wt % methacrylate<br>8 wt % glycidyl methacrylate<br>Acid no. = 25 mg KOH/g |
| VIII | Dimer fatty acid-polyamide | Viscosity (160° C.) = 60,000 mPas<br>Softening point = 90° C.<br>Amine no. = 6 mg KOH/g |

Viscosity: measured with Brookfield viscometer or as MFI.

From the constituents, components A or B are manufactured by mixing in the melt, subsequent cooling, and granulation to yield rod-shaped, spherical, or cushion-shaped parts approx. 5 to 10 mm in size.

| | Mixture 1 | Mixture 2 | Mixture 3 | Mixture 4 | Mixture 5 |
|---|---|---|---|---|---|
| Resin I | 35.0 | 30.0 | 35.0 | 39.0 | 41.0 |
| Inert polymer II | 22.5 | 15.0 | 22.5 | 25.5 | 27.0 |
| Inert polymer III | 22.5 | 15.0 | 22.5 | 25.5 | 27.0 |
| Polymer IV | | | 20.0 | 10.0 | 5.0 |
| Polymer V | 20.0 | 40.0 | | | |
| | | | | | |
| Sum of components | 100.0 | 100.0 | 100.0 | 100.0 | 100.0 |
| Softening point (° C.) | 86.0 | 90.5 | 96.1 | 92.1 | 88.3 |

-continued

| | | | | | |
|---|---|---|---|---|---|
| Viscosity, 120° C. (mPa s) | 123,750 | 444,982 | 57,250 | 45,700 | 40,500 |
| Viscosity, 160° C. (mPa s) | 25,250 | 84,000 | 14,643 | 11,600 | 10,200 |

| | Mixture 6 | Mixture 2 | Mixture 8 |
|---|---|---|---|
| Resin I | | 30.0 | 30.0 |
| Inert polymer II | | 15.0 | 15.0 |
| Inert polymer III | | 15.0 | 15.0 |
| Polymer VI | | 40.0 | |
| Polymer VII | | | 40.0 |
| Polymer VIII | 100.0 | | |
| Sum: | 100.0 | 100.0 | 100.0 |
| Softening point (° C.) | 90.0 | 112.5 | 116.6 |
| Viscosity, 160° C. (mPa s) | 67,250 | 144,375 | 250,833 |

The individual mixtures exhibit suitable viscosity and a low softening point. They are thermoplastic.

The mixtures are granulated (approx. 5 mm).

From the mixtures, melt adhesives according to the present invention are produced.

| Mixture no. | Example (V) 1 | V 2 | V 3 | V 4 | V 5 | V 6 | V 7 |
|---|---|---|---|---|---|---|---|
| 7 | 50.0 | | 50.0 | 50.0 | | | |
| 8 | | 50.0 | | | | | |
| 1 | | 50.0 | 50.0 | | | | |
| 2 | 50.0 | | | 50.0 | | | |
| 6 | 50.0 | | | | 50.0 | 50.0 | 50.0 |
| 3 | | | | | 50.0 | | |
| 4 | | | | | | 50.0 | |
| 5 | | | | | | | 50.0 |
| Sum: | 100.0 | 100.0 | 100.0 | 100.0 | 100.0 | 100.0 | 100.0 |
| Viscosity, 160° C. (mPa s) | 97,750 | 101.25 | 73,667 | 126,750 | 299,500 | 150,000 | 103,000 |
| Viscosity, 160° C.; 10 min (mPa s) | | 129.25 | 97,667 | 227,500 | | | |
| Viscosity, 160° C.; 20 min (mPa s) | 153,000 | 344.00 | Not determined | Not determined | 403,500 | 198,000 | 130,500 |
| Viscosity, 160° C.; 30 min (mPa s) | 245,500 | Not determined | | | 492,000 | 222,500 | 141,500 |
| Viscosity, 160° C.; 40 min (mPa s) | 480,833 | | | | 717,500 | 249,000 | 153,000 |

The mixed samples exhibit an elevation in viscosity upon heating.

V1 and V3 are melted at 130° C., mixed, and applied onto a PE substrate. The lay& thickness is approx. 300 μm. Onto this substrate, a second one of the same kind is laid, and is heated for 7 min at 170° C.

The peel resistance according to DIN EN ISO 11339 is measured:

V1: 30 N/25 mm
V2: 60 N/25 mm.

A heat-shrink tube is equipped on the inner side with an adhesive V4 (5 g/cm).

It is slid over a cable end and then heated for 10 seconds to approx. 170° C. using hot air.

The shrunk-on connection is connected in mechanical stable fashion.

What is claimed:

1. A reactive melt adhesive comprising two separately present components A and B each containing one or more polymers A or B having different functional groups, wherein these groups can react with one another under the influence of temperature, and the functional groups reactive with one another are selected from hydroxy, amine, carboxylic acid, anhydride, epoxy groups, nonreactive polymers and/or additives are contained in at least one of the components, the components are present in physically separated regions, wherein the adhesive exhibits a first temperature in a range between 80 and 150° C. in which the components melt and are miscible with one another but the functional groups do not react with one another, the adhesive exhibits a second temperature range between 130 and 190° C. in which it can melt and chemically crosslink, wherein the second temperature is above the first temperature.

2. The melt adhesive according to claim 1, wherein the melting temperature and the crosslinking temperature are separated from one another by at least 30° C.

3. The melt adhesive according to claim 1, wherein the composition contains up to 80 wt % nonreactive polymers and/or resins.

4. The melt adhesive according to claim 1, wherein the reactive polymers A and/or B have a viscosity from 10,000 to 2,000,000 mPas or an MFI from 2 to 2500 g/10 min in the first temperature range.

5. The melt adhesive according to claim 1, wherein the melt adhesive contains EVA as an inert polymer.

6. The melt adhesive according to claim 1, wherein functionalized ethylene/(meth)acrylate copolymers are employed as polymer A and B.

7. The melt adhesive according to claim 1, wherein functionalized ethylene/(meth)acrylate copolymers which contain multiple functional groups per molecule chain are employed as polymer A and B.

8. The melt adhesive according to claim 1, wherein the adhesive has a viscosity from 10,000 to 500,000 mPas in the second temperature range.

9. The melt adhesive according to claim 1, wherein component A contains polymer A, and component B contains polymer B.

10. A coated substrate made up of a carrier material that has on one side a layer of the reactive melt adhesive according to claim 1.

11. The coated substrate according to claim 10, wherein the layer has a thickness from 5 to 500 μm.

12. The coated substrate according to claim 10, wherein the layer has a thickness from 10 to 200 μm.

13. The coated substrate according to claim 10, wherein the substrate is a plastic substrate.

14. The coated substrate according to claim 10, wherein the substrate is a plastic tube that has an adhesive layer on the inner side.

15. The coated substrate according to claim 14, wherein the plastic tube is a heat-shrink tube having a shrinkage temperature in the region of the second temperature range.

16. A coated substrate made up of a flexible film that has on one side a layer of the reactive melt adhesive according to claim 1.

17. A coated substrate made up of a carrier material that has on one side a layer of cured reaction products of the reactive melt adhesive according to claim 1.

18. A method for adhesively bonding substrates, wherein a substrate pre-coated with the adhesive according to claim 1 is placed onto an object and, subjected to pressure and heating to a temperature in the second temperature range, the adhesive flows and crosslinks.

19. The method according to claim 18, characterized in that the heating is carried out by IR, NIR, hot air, or heating plates.

* * * * *

UNITED STATES PATENT AND TRADEMARK OFFICE
CERTIFICATE OF CORRECTION

PATENT NO. : 9,487,686 B2
APPLICATION NO. : 14/294872
DATED : November 8, 2016
INVENTOR(S) : Ruediger Butterbach et al.

It is certified that error appears in the above-identified patent and that said Letters Patent is hereby corrected as shown below:

In the Specification

Column 3, Line 42: Change "trimethyloipropane" to -- trimethylolpropane --.

Column 5, Line 42: Change "a-methylstyrene" to -- α-methylstyrene --.

Column 9, table (column: V2 and row: viscosity, 160° C (mPa s)): Change "101.25" to -- 101,25 --.

Column 9, table (column: V2 and row: viscosity, 160° C 10 min (mPa s)): Change "129.25" to -- 129,25 --.

Column 9, table (column: V2 and row: viscosity, 160° C 20 min (mPa s)): Change "344.00" to -- 344,00 --.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*